8690X
J. S. DICK.
THRASHING, HULLING, AND SHELLING MACHINE.
Patented Mar. 13, 1835.
NO PRINTED COPY OF SPECIFICATION IN OFFICE.
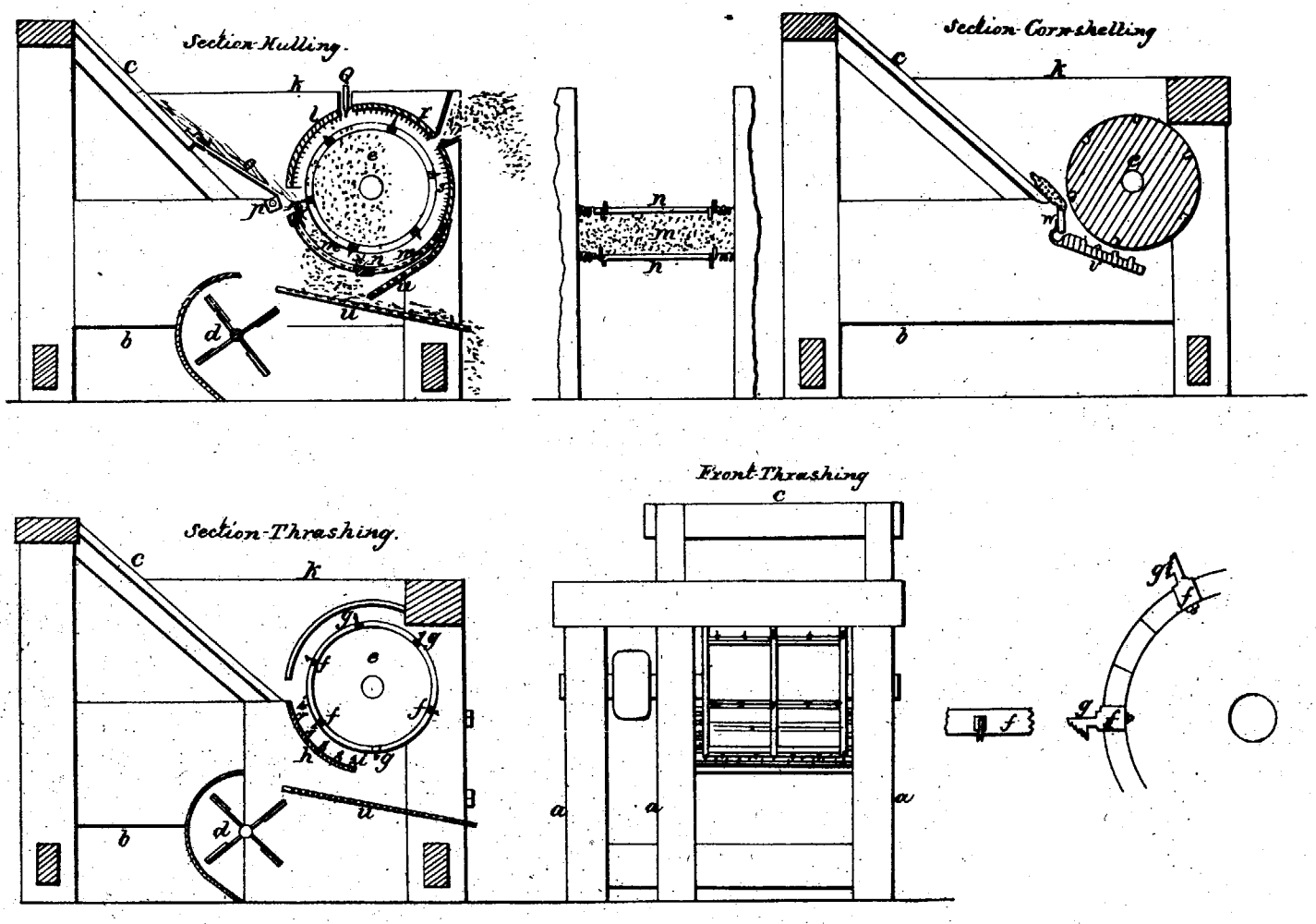

ar 13

8690 X March 13.1835 245.

Jesse S. Dicks, County of Genessee, State of New York.

Letters Patent.

The Schedule referred to in these letters patent and making part of
the same, containing a description in the words of the said Jesse
S. Dick, himself of his improvements in a Thrashing, Clover Hulling
& Corn shelling Machine.

To all to whom these presents shall come: Be it known that I
Jesse S. Dick, in the County of Genessee and State of New York
have invented a new and useful improvements in a Thrashing, Clo-
ver Hulling and Corn shelling Machine and that the following
is a full and exact description of the construction & operation
of the said Machine as invented or improved by me.

The frame which is about three feet long and made of Timber
of a sufficient strength, consists of three front and two back posts
about 3 ft 4 In, and 3 ft. 11 In. high into which are tenoned near
their middle, two substantial side pieces about 10 inches broad,
the tenons in the front posts being short and confined by screws
so as to unship and admit of being removed at pleasure; near
the bottom of the posts are also tenoned side & cross girts to strength-
en and support the frame, on the top of the back frame is a cross
piece which together with two pieces rising obliquely & backwards
from the top edges of the side pieces near their middle, to said
cross piece forms a support for the inclined feeding apron to rest
upon. The front posts are connected by a substantial cross cap
piece and to the back faces of the two outside posts and nearly
on a level with the top edges of the side rails are fixed by tenons
or screws the bearings of the journals of the cylinder which should
run in composition boxes, the space between the two left hand posts
being only sufficient for the wheel of the cylinder shaft to pass be-
tween them. On the inside of the front ends of the side pie-
ces

[illegible]

8690X pieces are made two circular grooves into which the concave
slides; the sides of the frame being closed from the front to near
the middle by planking on the inside of the side pieces exten
=ding to the ground. the fan is placed nearly under the con-
-cave having its bearings in the planking and being covered
in rear by a circular case. also close under the concave
there is an inclined board which falls to the front that is let into
the side planks. The cylinder is composed of two heads or wheels
made of iron or other suitable material secured to an iron shaft
On the circumference of these heads are placed longitudinally
6 or more iron bars of say 3/8 inch iron & the intermediate spaces
being filled with wooden strips or staves of the same thickness made
moveable by means of screws, the whole is bound firmly together
by three iron bands, one placed at each end and one in the mid-
dle of the cylinder - holes are made in these bars at equal
distances to receive the teeth which are to range on alternate
bars; these teeth are made of 1/2 inch iron in form resembling
the catch of a common thumb latch having a tang shoulder and
oblique side; the oblique side or edge is serrated like a saw or
bearded by the strokes of a chisel with a groove or channel passing
down the centre and are secured to the bars by screw nuts on the
under side, those on the extremity of each alternate bar pass
entirely throug the band, bar and rim or wheel to confine the bands
to their places - as also do those on the middle. The concave which
is of cast iron 3/4 inch thick is one fifth of a circle with five
rows of teeth standing on ribs that project 7/8 inch, four of these
rows stand alternate but the fifth or bottom row has double the
number, and therefore range with the teeth and spaces
of the rest, these teeth are of the same form as those in the cylin
-der except that they are not serrated, and are made fast
to the concave by screw nuts on the under side. The Hopper
consists simply of two light side pieces which rest on the
feed apron already mentioned and fit close to the front
posts posts, the top edge being level and their front ends connected
by a circular or square case which encompasses that part of
the cylinder contiguous thereto except a small portion near
the lip of the apron sufficient for the feeding. Operation for
Thrashing. The cylinder being put in revolution by a band from
the power wheel to the pulley the sheaves are placed on the apron
so that the heads pass between the cylinder & concave and the
thrashed grain and straw is discharged on the opposite or
front side of the Machine in the usual way. — For hulling
the hopper. the staves of the cylinder and the concave as above
described are removed, and the following parts substituted
or added. To remove the concave it only being necessary
to unship the front posts of the frame. A hopper formed of a
bottom piece and side pieces similar to that used for
thrashing except that the front is formed by the upper con-
cave instead of the cylinder case and the lower edges of the
front ends descends to the grooves of the concave and are
shaped to coincide with them having a frame and wire or punch-
-ed iron seive fitted thereto which takes the place of the concave
Just removed being of the same size. viz. 1/5. of a circle on the upper
sides of the two crossbars of the seive frame rests two small
metal shafts which have their bearings on the side pieces of
the hopper and to the upper side of which are fixed by brazing
or otherwise teeth that point towards the center of the cylinder,
said shafts are also furnished with spiral springs at their
extremities made fast to the side of the hopper for the pur-
-pose of permitting a partial revolution of the shafts when the
teeth are engaged and to bring them again to their places.
The lip of the feed apron in this hopper is a strip of board 6 or 8 in-
-ches wide attached by hinges to the apron and caused when
the Machine is in Operation to vibrate rapidly by the revolution
of a square shaft on which its outer edge rests. The upper con-
cave above mentioned commences a short distance above this this lip being a segment of the same circle with the lower seive
And extends to near the top edge of the of the sides of the hopper
where it meets with and buts against a division board which
I call the regulator that slides in grooves made in the sides
of the hopper at right angles to the concave and reaches
from the concave to the upper edge of the hopper, the lower
edge of this regulator is armed with strong points as also
the upper and lower margins of the concave, the intermediate
space of the latter being filled with shorter points made of
light iron wire say 1/8 inch diameter to project 1/8 of an inch, the
groove of the concave in the side pieces is continued to the
ends of said pieces for the purpose of receiving a portion
of a similar concave on the opposite or front side of the
cylinder which may be termed the upper front section,
For supporting this upper section, two perpendicular side pieces
are raised of the same heighth as the front posts and of a width a
part to admit them between the inner front posts of the
frame their front edges meeting the front edges of the hopper,
being notched where requisite to accomplish that object in the
lower part of these side pieces grooves are cut which receive
and support a frame and seive in front of the cylinder precisely
similar to that already described in its rear of which it is
only a continuation, this same groove is further continued
upwards and receives another section or concave similar
to those above described which extends from the last mentioned
seive to within a short distance of the upper front concave
leaving between them an opening for the discharge of the hulls
&c. when the Machine is operating- From the lower edge of the
upper front concave a division board of the whole width
of the Machine extends obliquely upwards and forward
to the top of the side pieces and together with a similar division
board hinged to the top edge of the lower front concave
forms the discharging opening for the chaff &c. the object
of of the hinges being to regulate the discharge, and for the
purpose of forming the wind channel, there are three other
division boards one passing obliquely under the lower edge
of the lower front concave to the center of the seives or cylin
der, the other a short distance under that last mentioned
which reaches beyond said center nearly to the fan. Operation
The hopper being filled the cylinder is set in revolution, opposite
to the direction used in threshing and also by means of bands
the fan and feeding shaft by the vibrations of the feeding lip the clo=
ver is fed to the cylinder, the serrated edges of the teeth drag it through the
points of the concaves, the seed fall through the seives and passing through
the current of wind from the fan fall upon the lower inclined division
board and are delivered under the Machine in front of the fan
the chaff &c. being discharged through the opening between the
front concaves left for that purpose. For Shelling Corn. that part
of the Machine first described for threshing is to be used only that
I substitute for the concave a flat bed piece the front portion or
margin of which is ribbed diagonally and having two upright face pie=
ces which are pressed against the cylinder by means of springs attach=
ed to the back edge of the bed piece. The Corn being fed in between these
face pieces and the cylinder is held against the latter and the cob
falling on the front or ribbed edge of the bed piece is conveyed
in a lateral direction and discharged at the end thereof.
Now what I claim as new and as my invention in the above descri=
bed Machine is, First the peculiar form of the teeth in the cylinder with
serrated or bearded edges. 2nd the revolving bars or shafts of the seives armed
with long teeth and furnished with springs, and 3rd the arrangement of the
parts so adapted to each other as to allow of their being changed to use
the Machine for the purposes herein specified not intending hereby to
claim the concave cylinder, feeding apron &c. separately. In Testimony
that the foregoing is a true specification of my said improvement I have
hereunto set my hand this 26th day of February 1835.

Witnesses B. K. Morsell. D. S. Walters.

Jesse S. Dicks

2 / 26 / 1835